(12) United States Patent
Rombouts et al.

(10) Patent No.: US 9,584,514 B2
(45) Date of Patent: *Feb. 28, 2017

(54) BINDING MOBILE DEVICE SECURE SOFTWARE COMPONENTS TO THE SIM

(71) Applicant: NXP B.V., Eindhoven (NL)

(72) Inventors: Peter Maria Franciscus Rombouts, Sint-Katelijne-Waver (BE); Philippe Teuwen, Etterbeek (BE); Frank Michaud, Etterbeek (BE)

(73) Assignee: NXP B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/995,924

(22) Filed: Jan. 14, 2016

(65) Prior Publication Data
US 2016/0134629 A1   May 12, 2016

Related U.S. Application Data

(63) Continuation of application No. 14/134,905, filed on Dec. 19, 2013, now Pat. No. 9,264,899.

(51) Int. Cl.
*H04L 29/06* (2006.01)
*H04L 9/32* (2006.01)
*H04W 12/04* (2009.01)
*H04W 12/06* (2009.01)
*H04W 12/08* (2009.01)

(52) U.S. Cl.
CPC ........ *H04L 63/0876* (2013.01); *H04L 9/3271* (2013.01); *H04L 63/045* (2013.01); *H04L 63/08* (2013.01); *H04L 63/0853* (2013.01); *H04W 12/04* (2013.01); *H04W 12/06* (2013.01); *H04W 12/08* (2013.01); *H04L 2209/16* (2013.01); *H04L 2209/80* (2013.01); *H04L 2463/101* (2013.01)

(58) Field of Classification Search
CPC .................................. H04L 63/0876
See application file for complete search history.

(56) References Cited

U.S. PATENT DOCUMENTS 7,231,203 B2 * 6/2007 Marcelli ............. H04L 63/0869
455/410
7,574,599 B1   8/2009 Zhang
(Continued)

FOREIGN PATENT DOCUMENTS

EP    2506175 A1    10/2012
EP    2574090 A1    3/2013
(Continued)

OTHER PUBLICATIONS

Extended European Search Report for EP 14197176.2 dated Apr. 23, 2015.
(Continued)

*Primary Examiner* — Shawnchoy Rahman

(57) ABSTRACT

Various embodiments include a method for binding a secure software application to a mobile device wherein the mobile device includes a processor and a subscriber identity module (SIM) card, including transmitting, by the processor, an authentication challenge to the SIM card; receiving an authentication response from the SIM card; verifying the authentication response from the SIM card; and enabling the secure software application when the authentication response from the SIM card is verified.

14 Claims, 4 Drawing Sheets

(56) References Cited

U.S. PATENT DOCUMENTS

| | | | |
|---|---|---|---|
| 8,874,915 B1 | 10/2014 | Rodoper | |
| 2002/0169966 A1* | 11/2002 | Nyman | H04L 63/0407 |
| | | | 713/182 |
| 2003/0051041 A1 | 3/2003 | Kalavade et al. | |
| 2004/0015692 A1 | 1/2004 | Green | |
| 2005/0086479 A1 | 4/2005 | Ondet | |
| 2006/0235796 A1 | 10/2006 | Johnson | |
| 2014/0295794 A1 | 10/2014 | Doumen | |

FOREIGN PATENT DOCUMENTS

| | | | | |
|---|---|---|---|---|
| WO | WO 2006103383 A1 * | 10/2006 | | G06F 21/34 |
| WO | 2012130697 A1 | 10/2012 | | |

OTHER PUBLICATIONS

Hwang, et al., "An Efficient authentication protocol for GSM networks", Eurocomm 2000. Information Systems for Enhanced Public Safety and Security. IEEE/AFCEA May 17, 2000. IEEE, Jan. 1, 2000. pp. 326-329.

\* cited by examiner

BINDING MOBILE DEVICE SECURE SOFTWARE COMPONENTS TO THE SIM

CROSS REFERENCE TO RELATED APPLICATIONS

This is a continuation application of U.S. application Ser. No. 14/134,905 filed Dec. 19, 2013, which is hereby incorporated by reference for all purposes as if fully set forth herein.

TECHNICAL FIELD

Various exemplary embodiments disclosed herein relate generally to the use of a SIM to bind secure software components to a mobile device.

BACKGROUND

The Internet provides users with convenient and ubiquitous access to digital content. Because the Internet is a powerful distribution channel, many mobile devices strive to directly access the Internet. The mobile device may include a mobile telephone, smart phone, tablet, mobile hotspot, or any other device that is capable of accessing a mobile network. The use of the Internet as a distribution medium for copyrighted content creates the compelling challenge to secure the interests of the content provider. Increasingly, mobile devices operate using a processor loaded with suitable software to render (playback) digital content, such as audio and/or video. Control of the playback software is one way to enforce the interests of the content owner including the terms and conditions under which the content may be used. Previously many mobile devices were closed systems. Today more and more platforms are partially open. Some users may be assumed to have complete control over and access to the hardware and software that provides access to the content and a large amount of time and resources to attack and bypass any content protection mechanisms. In the case of mobile devices with subscriber identity module (SIM) cards, the attacker does not have control of the SIM card. As a consequence, content providers must deliver content to legitimate users across a hostile network to a community where not all users or mobile devices can be trusted.

Typically, digital rights management systems use an encryption technique based on block ciphers and a encryption/decryption key that process the data stream in blocks using a sequence of encryption/decryption steps, referred to as rounds. During each round, a round-specific function is performed. The round-specific function may be the same round function in each round but each round may use a different round-specific sub-key. For many encryption systems, the round function may be specified using mapping tables or look-up tables. Frequently tables are used for different parts of the function for efficient execution in software of encryption/decryption functions. Look-up tables may be implemented that combine multiple functions of the round. Further, instead of distributing user-specific keys, user-specific algorithms that incorporate a user-specific key may be distributed instead of keys for encryption or decryption algorithms. These algorithms have to be obfuscated (hidden) in order to prevent redesign or prohibit obtaining the user-specific key. Accordingly, the encryption/decryption function may be carried out using tables accompanied with some computer code.

Content providers must deliver content to legitimate users across a hostile network to a community where not all users or devices can be trusted. This has lead to the development of white-box cryptography. In the white-box cryptography scenario it is assumed that the user has complete control of the hardware and software that provides access to the content, and an unlimited amount of time and resources to attack and bypass any content protection mechanisms. The secure software code that enforces the terms and conditions under which the content may be used should be tamper resistant. The general approach in digital rights management for protected content distributed to mobile devices is to encrypt the digital content using for example, DES (Data Encryption Standard), AES (Advanced Encryption Standard), or using other known encryption schemes, and to use decryption keys to recover the digital content.

The two main areas of vulnerability of digital rights management relying on encryption are the software modules which enforce the terms and conditions under which the content may be used, and the key distribution and handling. Typically, the software module enforces the terms and conditions under which the content is to be used. An attacker aiming to bypass these terms and conditions may attempt to achieve this through tampering of the program code of the software module.

Regarding key distribution, a media player has to retrieve a decryption key from a license database in order to play back the media. The media player then has to store this decryption key somewhere in memory for the decryption of the encrypted content. This leaves an attacker two options for an attack on the key. First, an attacker may reverse engineer the license database access function allowing the attacker to retrieve asset keys from all license databases. In this situation the attacker does not need to understand the internal working of the cryptographic function. Second, the attacker may observe accesses of the memory during content decryption, thus the attacker may retrieve the decryption key. In both cases the key is considered to be compromised.

The widespread use of DRM has given rise to the need for secure, tamper-resistant software seeks to complicate tampering with the software, but various other applications may require the use of secure, taper-resistant software as well. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete control of the system running the white-box cryptography software. Thus, the attacker can modify inputs and outputs, track the operations of the software, sample and monitor memory used by the software at any time, and even modify the software. Accordingly, the cryptographic functions need to be carried out in a manner that prevents the disclosure of secret information used in the cryptographic functionality. Further, the cryptographic functions carried out by the white-box cryptography system are any type of cryptographic function, for example, encrypting/decrypting data using symmetric or asymmetric methods, executing hash functions, calculating digital signatures, performing key exchange protocols, performing authentication protocols, etc. White-box cryptography functions may be implemented in various ways. Such methods include: obscuring the software code: using complex mathematical functions that obscure the use of the secret information: using look-up tables: or any other methods that carry out cryptographic functions but hide the secret information needed for those cryptographic functions. Typically a white-box implementation will also contain components to bring anti-debugging and tamper-proofing properties.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method for binding a secure software application to a mobile device wherein the mobile device includes a processor and a subscriber identity module (SIM) card, including transmitting, by the processor, an authentication challenge to the SIM card; receiving an authentication response from the SIM card; verifying the authentication response from the SIM card; and enabling the secure software application when the authentication response from the SIM card is verified.

Various exemplary embodiments relate to a method for binding a secure software application to a mobile device wherein the mobile device includes a processor and a subscriber identity module (SIM) card, including authenticating, by the processor, a connection between the mobile device and a mobile network control server, transmitting an authentication challenge to the SIM card; receiving an authentication response from the SIM card; sending the authentication response from the SIM card to the mobile network control server, receiving from the mobile network control server a verification of the authentication response from the SIM card; and enabling the secure software application when the authentication response from the SIM card is verified by the mobile network control server.

Various exemplary embodiments relate to a method for binding a secure software application to a mobile device wherein the mobile device includes a processor and a subscriber identity module (SIM) card, including authenticating, by the processor, a connection between the mobile device and a mobile network control server, requesting from the mobile network control server a verification of the SIM card; receiving from the mobile network control server a verification of the SIM card; and enabling the secure software application when the SIM card is verified by the mobile network control server.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

As described above secure software applications may be used to carry out various functions. In certain situations it is desirable to bind a secure software application to a specific device such as a mobile device. Such binding can prevent an attacker from simply copying the secure software to another device and using it in an unauthorized manner. Below embodiments are described that bind a secure software application to a specific mobile device using a subscriber identity module (SIM) card.

Figure 1:
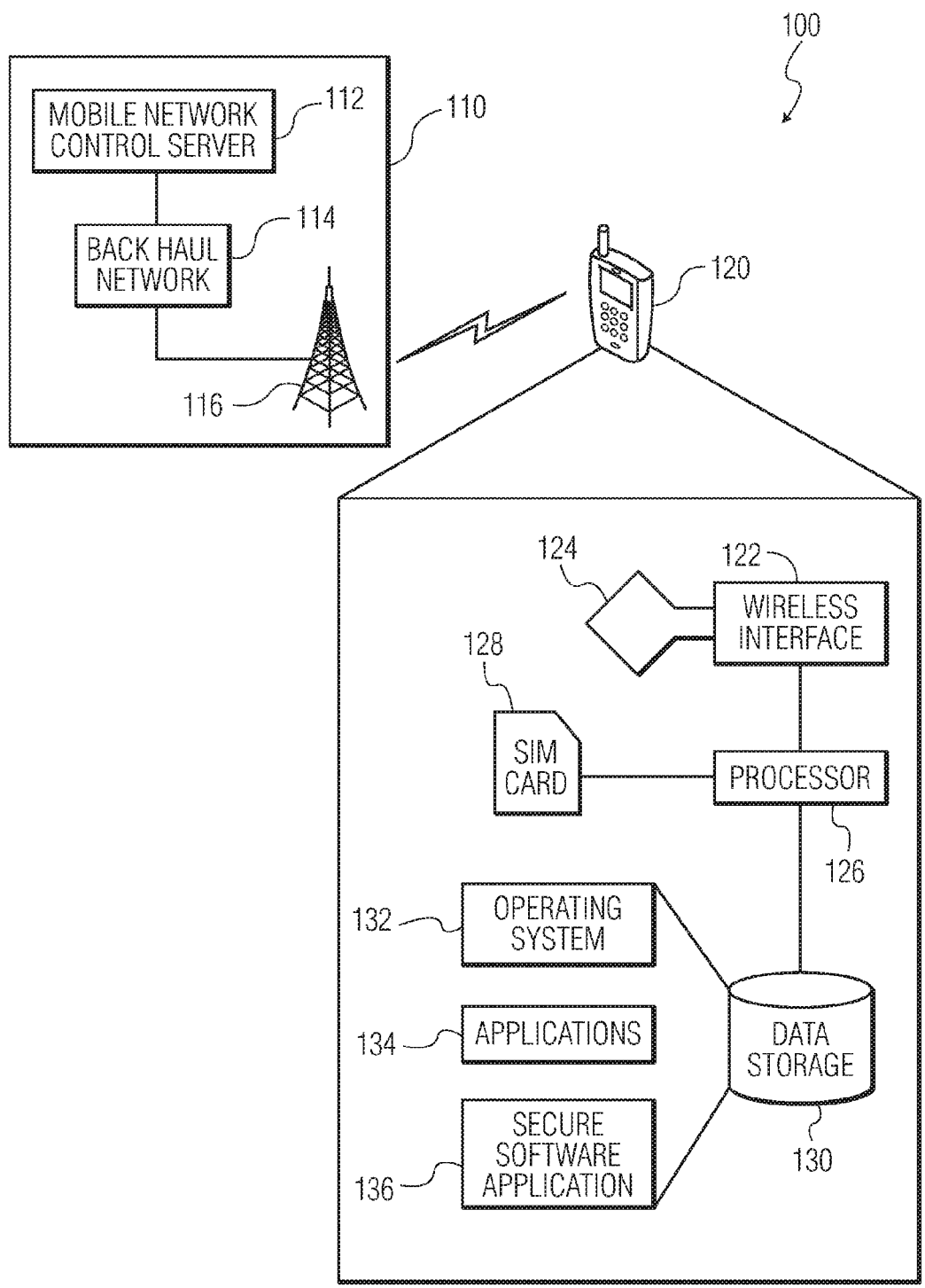
FIG. 1 illustrates a communication system including a mobile device and a mobile network.

FIG. 1 illustrates a communication system including a mobile device and a mobile network. The mobile network 110 may include mobile network control server 112, a back haul network 114, and a base station 116. The mobile network 110 may communicate with a mobile device 120.

The base station 116 communicates with the mobile device 120 using a wireless channel and protocol. A mobile network 110 will have a plurality of base stations 116 to provide mobile service coverage over a desired geographic region. The base station 116 includes antennas to communicate wirelessly with the mobile devices 120. Receivers in the base station 116 down convert, demodulate, and detect the wireless signal received from the mobile device 120 via the antennas. Also, the base station 116 includes transmitters that modulate and transmit a wireless signal to the mobile device 120. The base station 116 converts the received wireless signal into a data stream that is then transmitted to the back haul network 114. The base station 116 may connect to the back haul network 114 using any known connection type and any known communication protocol. Typically, the connection between the base station 116 and the back haul network 114 will be via a wide bandwidth electrical or optical cable connection. In certain remote installations or other difficult to reach locations, the back haul connection may also be wireless.

The back haul network 114 provides connectivity between the base station 116 and the mobile network control server 112. Also, the back haul network 114 may be connected to other networks to provide network connectivity such as to the internet.

The network control server 112 provides control of the mobile network 110. One aspect of this control is the authentication of mobile devices 120 to the mobile network. When a mobile device 120 accesses the mobile network 110, the mobile subscriber must be authenticated in order to use the network. This authentication will be described below in more detail.

The mobile device 120 may be a mobile telephone, smart phone, tablet, mobile hotspot, or any other device that is capable of accessing the mobile network 110. The mobile device 120 may include a wireless interface 122, antenna 124, a processor 126, a SIM card 128, and a data storage 130. The antenna 124 may receive and transmit wireless signals in order to communication with the mobile network 110. The wireless interface 122 may include transmitters and receivers connected to the processor 126. The transmitters receive data from the processor 126 that is modulated and transmitted to the mobile network. The receivers receive a wireless signal from the mobile network and demodulate the signal into data to be sent to the processor 126.

The processor 126 controls the operation of the mobile device 120. The processor 126 may execute software instructions stored in the data storage 130. The data storage 130 may be any data storage used in conjunction with the processor 126 and may include both volatile and non-volatile storage including, for example, disk drives, optical drives, random access memory (RAM), flash memory, etc. The data storage may also store data (not shown) used by the mobile device 120 and its applications.

Various types of software instructions may be stored in the data storage 130, including for example, operating system 132, applications 134, and secure software application 136. The operating system 130 may be any of numerous operating systems that may be implemented in the mobile device 120. The operating system may provide the user interface and provide various services such as running applications, accessing stored data, and controlling various hardware functions such as controlling the wireless interface 122. Applications 134 may be any applications installed on the mobile device 120 that may be run by the user of the mobile device 120.

The secure software application 136 (as described above) may be an application designed to securely perform various general functions as well as cryptographic functions such as decryption, encryption, digital signature, etc. In spite of the fact that an attacker of the mobile device 120 may have complete control over the mobile device 120 including altering the secure software application, tracking each step of the secure software application, accessing memory during operation of the secure software application, etc. Various techniques may be used to implement the secure software application 136 as described above.

For example, the secure software application may provide a secure environment for the use of digital rights management (DRM) software by decrypting encrypted media content. Also, the secure software application may be used to implement a digital signature protocol for use by the mobile device 120 to digitally sign messages.

The mobile device 128 also includes a SIM. The SIM is an integrated circuit that securely stores the international mobile subscriber identity (IMSI) and the related key used to identify and authenticate a subscriber on the mobile device 120 to the mobile network 110. Typically, a SIM circuit is embedded into a removable plastic card. This plastic card is called a SIM card 128 and can be transferred between different mobile devices.

A SIM card 128 contains its unique serial number (IC-CID), international mobile subscriber identity (IMSI), security authentication and ciphering information, temporary information related to the local network, a list of the services the user has access to and two passwords: a personal identification number (PIN) for ordinary use and a personal unblocking code (PUK) for PIN unlocking.

Each SIM holds a unique key $K_i$ assigned to it by the operator during the personalization process. The $K_i$ is also stored in a database on mobile network control server 112. $K_i$ is a 128-bit value used in authenticating the SIMs on the mobile network 110. Further, additional keys may be shared and stored that are derived from $K_i$ and/or that may have the same characteristics as $K_i$.

The SIM card is designed not to allow the $K_i$ to be obtained using the smart-card interface. Instead, the SIM card provides a function, Run GSM Algorithm, that allows the phone to pass data to the SIM card to be signed with the $K_i$. This, by design, makes usage of the SIM card mandatory unless the $K_i$ can be extracted from the SIM card, or the carrier is willing to reveal the $K_i$.

$K_i$ is used to authenticate a mobile device 120 to the mobile network 110. When the mobile device 120 starts up, it obtains the International Mobile Subscriber Identity (IMSI) from the SIM card 128, and passes this to the mobile network control server 112 requesting access and authentication. The device 120 may have to pass a PIN to the SIM card 128 before the SIM card 128 will reveal this information. The mobile network control server 112 searches its database for the incoming IMSI and its associated $K_i$. The mobile network control server 112 then generates a random number and signs it with the $K_i$ associated with the IMSI and stored on the SIM card 128, computing another number known as signed response 1 (SRES_1). The mobile network control server 112 then sends the random number to the mobile device 120, which passes it to the SIM card 128. The SIM card 128 signs it with its $K_i$ producing signed response 2 (SRES_2), which it provides to the mobile device 120 along with encryption key $K_c$. The mobile device transmits SRES_2 to the mobile network 110. The mobile network 110 then compares its computed SRES_1 with the computed SRES_2 that the mobile device 120 returned. If the two numbers match, the SIM is authenticated and the mobile device 120 is granted access to the mobile network 120. K is used to encrypt all further communications between the mobile device 120 and the mobile network 120.

Figure 2:
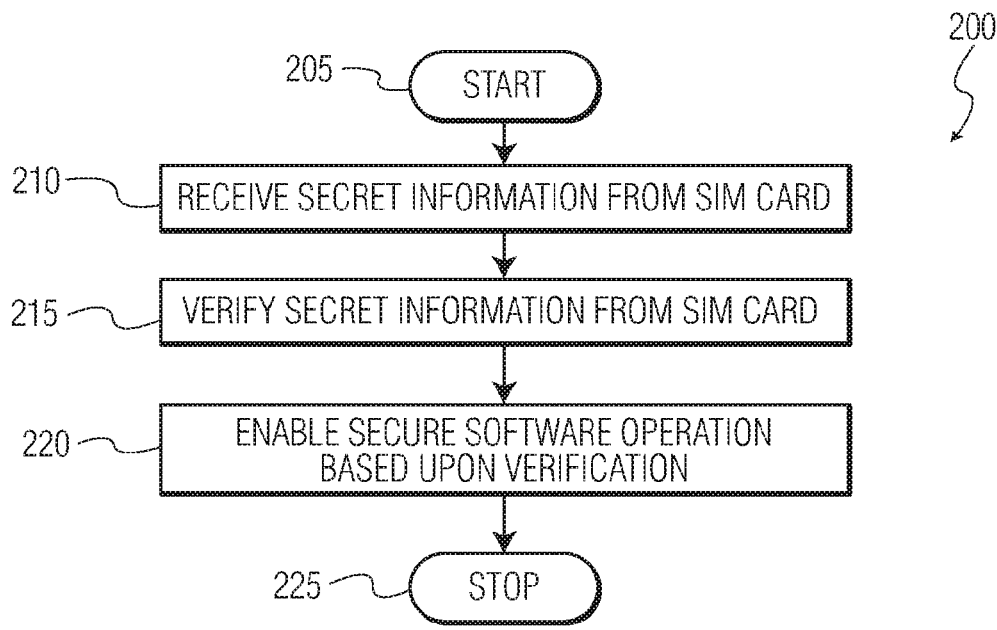
FIG. 2 illustrates a method of authenticating a secure software application running on a mobile device using a SIM card.

As described above, in order to prevent an attacker from moving the secure software application 136 from one authorized mobile device to another unauthorized mobile device, the secure software application 136 may be bound to the SIM card in the mobile device 120. A first method of binding the secure software application to the SIM card includes sharing secret information between the SIM card and the secure software application. FIG. 2 illustrates a method of authenticating a secure software application running on a mobile device using a SIM card. The secure software application may initially be disabled or have specific portions of the application disabled. The method 200 begins at 205. First, the secure software application 136 may receive secret information from the SIM card 210. Next, the secure software application 136 may verify the secret information received from the SIM card 215. Then the secure software application 136 enables the secure software operation or enables operation of secure portions of the secure software application 220 if the secret information from the SIM card 128 is verified. The method 200 then ends at 225. This approach is susceptible to an attacker intercepting the secret information transmitted from the SIM card 128 to the secure software application 136. In order to minimize the likelihood of intercept, the secure software application 136 and the SIM card may initiate a number of different transfers of data, and only one of them contains the actual secret information. Also, the authentication may only occur once when the secure software application is first initialized. Also, if the secret information is not verified, the secure software application 136 may completely disable itself, preventing further operation of the secure software application 136. Also, there may be situations where certain portions of the secure software are allowed to operate even if the software is not verified.

Figure 3:
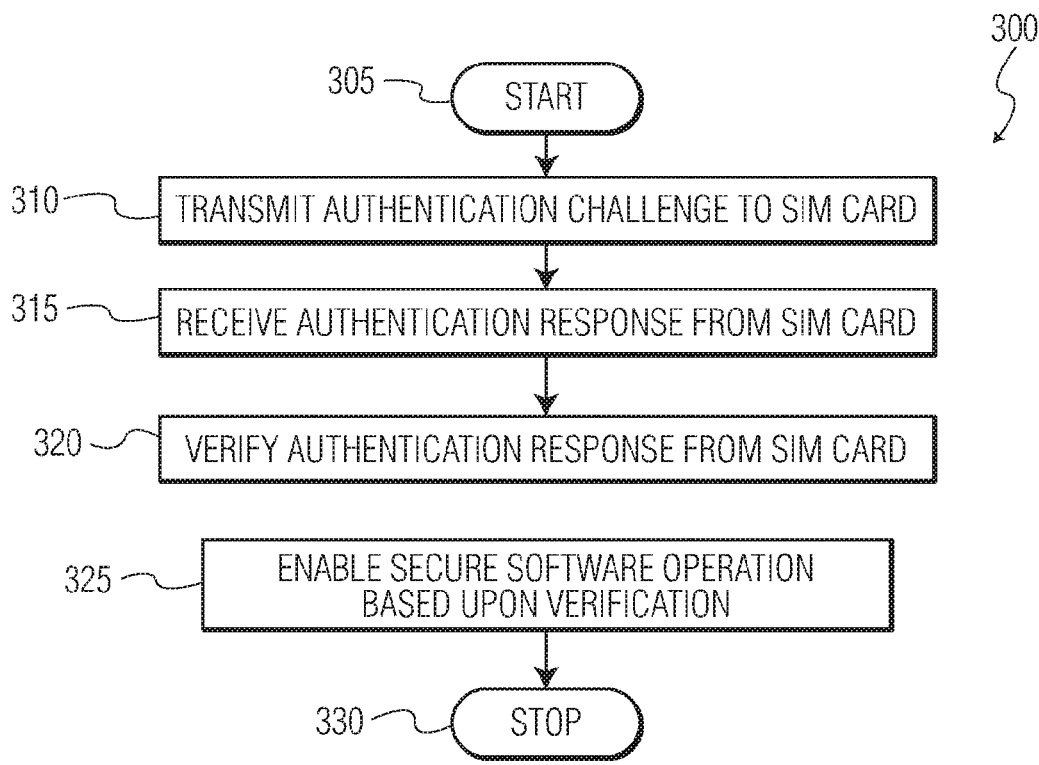
FIG. 3 illustrates a second method of authenticating a secure software application running on a mobile device using a SIM card.

Another approach may be used to authenticate the mobile device 120 to the secure software application 136 that improves upon the previous approach. This second embodiment uses an authentication protocol between the SIM card 128 and the secure software application 136. FIG. 3 illustrates a second method of authenticating a secure software application running on a mobile device using a SIM card. The secure software application may initially be disabled or have specific portions of the application disabled. The method 300 begins at 305. Next, the secure software application 136 transmits an authentication challenge 310 to the SIM card 128. Then the secure software application 136 receives an authentication response 315 from the SIM card 128. Next, the secure software application 136 verifies the authentication response 320 from the SIM card 128. If the authentication response from the SIM card 128 is verified, then the secure software application 136 or secure portions of the secure software application are enabled 325. If not, then the secure software application is not enabled. Alternatively, there may be situations where certain portions of the secure software are allowed to operate even if the software is not verified. The method then ends at 330. The authentication protocol described in steps 310, 315, and 320 may include additional steps and may implement any known authentication protocol. Such protocols may take advantage of the secure key $K_i$ stored on the SIM card 128 and any keys securely stored on the secure software application 136. If the mobile network provider has control of the implementation of the secure software application 136, it is even possible that an encrypted copy of key $K_i$ may be stored in the secure software application 136. For example, a portion of the secure software application 136 may implement a block cipher, for example the advanced encryption standard (AES), which may be used to encrypt keys stored with and for use by the secure software application. Such keys may include symmetric and asymmetric keys. Also, another portion of the secure software application 136 may implement digital signatures in order to authenticate messages from the secure software application 136. The specific instance of the secure software application 136 installed on the mobile device 120 may be customized with keys and other information needed to be able to authenticate the associated SIM card 128 in the mobile device 120. Also, an authentication protocol like that used when the mobile device 120 seeks access to the mobile network 110 may be used. In addition, the capabilities of the standard SIM card 128 may be expanded in order to carry out an authentication protocol with the secure software application 136.

Figure 4:
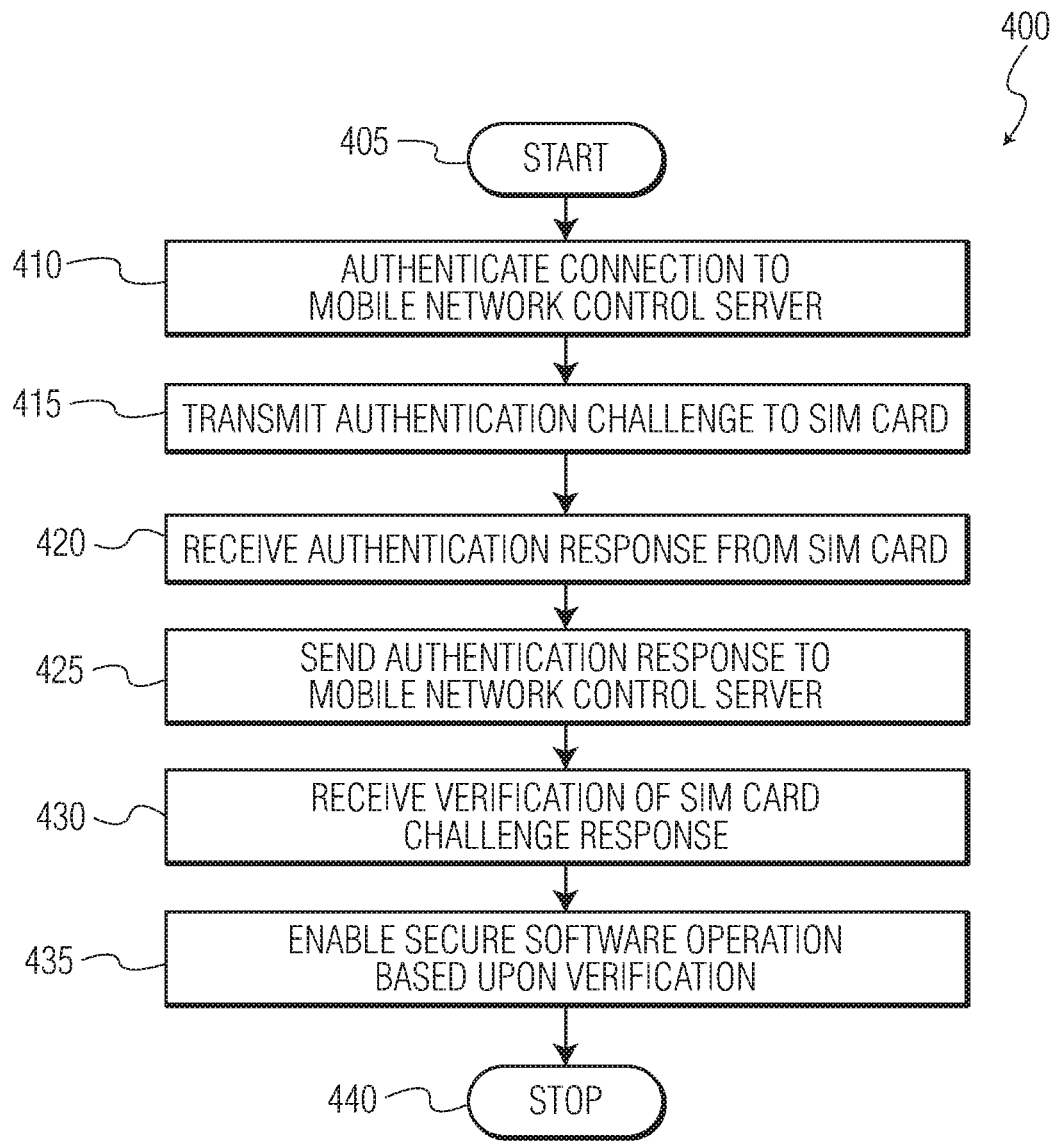
FIG. 4 illustrates a third method of authenticating a secure software application running on a mobile device using a SIM card and a mobile network control server.

Yet another approach may be used to authenticate the mobile device 120 to the secure software application 136 that improves upon the previous approaches. This third embodiment uses an authentication protocol between the SIM card 128 and the secure software application 136 but also uses the mobile network control server 112 in the protocol. FIG. 4 illustrates a third method of authenticating a secure software application running on a mobile device using a SIM card and a mobile network control server. The secure software application may initially be disabled or have specific portions of the application disabled. The method 400 begins at 405. Then the secure software application performs an authentication protocol 410 with the mobile network control server 112 in order to authenticate a connection to the network control server 112. Any known authentication protocol may be used to authenticate this connection. Such protocol may include the private and secure sharing of information between the mobile network control server 112 and the secure software application 136 before the secure software application 136 is installed on the mobile device 136. Next, the secure software application 136 transmits an authentication challenge 415 to the SIM card 128. Then the secure software application 136 receives an authentication response 420 from the SIM card 128. Next, the secure software application 136 sends the authentication response 425 from the SIM card 128 to the mobile network control server 112. The mobile network control server 112 then verifies the authentication response from the SIM card 128. The secure software application 136 then receives a verification of the SIM card challenge response 430 from the mobile network control server 112. If the authentication response from the SIM card 128 is verified by the mobile network control server 112, then the secure software application 136 or secure portions of the secure software application are enabled 435. If not, then the secure software application is not enabled. Alternatively, there may be situations where certain portions of the secure software are allowed to operate even if the software is not verified. The method then ends at 440.

The authentication protocol described in steps 415, 420, 425, and 430 may include additional steps and may implement any known authentication protocol. Such protocols may take advantage of the secure key $K_i$ stored on the SIM card 128 and any keys securely stored on the secure software application. For example, a portion of the secure software application 136 may implement a block cipher, for example the advanced encryption standard (AES), which may be used to encrypt keys stored with and for use by the secure software application. Such keys may include symmetric and asymmetric keys. Also, another portion of the secure software application 136 may implement digital signatures in order to authenticate messages from the secure software application 136. The specific instance of the secure software application 136 installed on the mobile device 120 may be customized with keys and other information needed to be able to authenticate the associated SIM card 128 in the mobile device 120. Also, an authentication protocol like that used when the mobile device 120 seeks access to the mobile network 110 may be used. In addition, the capabilities of the standard SIM card 128 may be expanded in order to carry out an authentication protocol with the secure software application 136 and the mobile network control server 112. This third method has the benefit of an attacker needing to spoof two connections of the secure software application 136. Also, the mobile network control server 112 operates in a black box environment, meaning it would be very hard for an attacker to successfully break the security of the mobile network control server 112.

Figure 5:
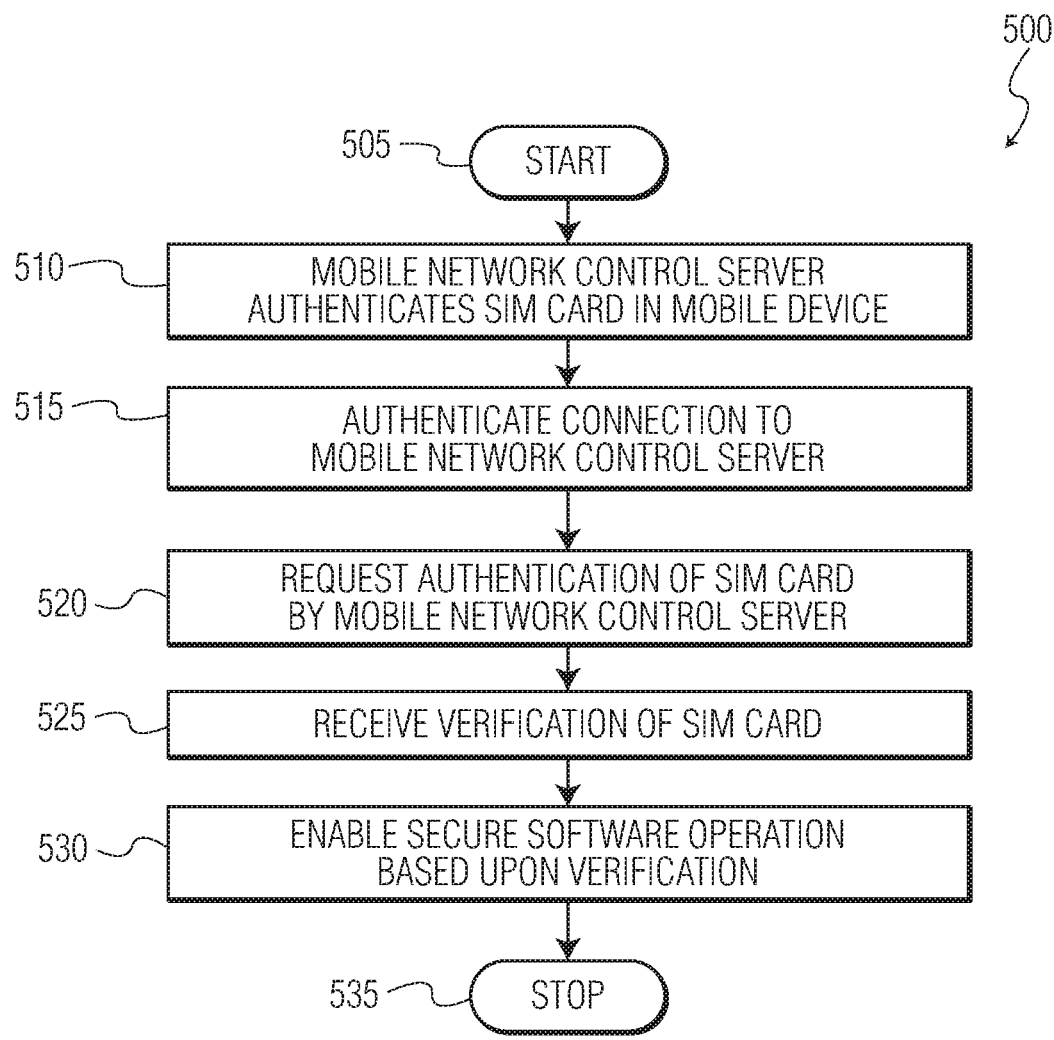
FIG. 5 illustrates a fourth method of authenticating a secure software application running on a mobile device using a SIM card and a mobile network control server.

Yet another approach may be used to authenticate the mobile device 120 to the secure software application 136. This fourth embodiment uses an authentication protocol between the SIM card 128 and the mobile network control server 112 to verify the SIM card and enable to secure software application 136. FIG. 5 illustrates a fourth method of authenticating a secure software application running on a mobile device using a SIM card and a mobile network control server. The secure software application may initially be disabled or have specific portions of the application disabled. The method 500 begins at 505. Next, the mobile network control server 112 authenticates 510 the SIM card 128. An example of such an authentication protocol was described above. It is also possible that such authentication may include additional steps or that a different authentication protocol may be used to achieve a more secure authentication of the SIM card 128 when seeking to validate a SIM card 128 for use with a secure software application 136. Then the secure software application performs an authentication protocol 515 with the mobile network control server 112 in order to authenticate a connection to the network control server 112. Any known authentication protocol may be used to authenticate this connection. Such protocol may include the private and secure sharing of information between the mobile network control server 112 and the secure software application 136 before the secure software application 136 is installed on the mobile device 136. Next, the secure software application 136 requests 520 that the mobile network control server authenticate the SIM card 128. Then the secure software application 136 receives 525 from the mobile network control server 112 a verification of the SIM card 128. If the SIM card 128 is verified by the mobile network control server 112, then the secure software application 136 or secure portions of the secure software application are enabled 530. If not, then the secure software application is not enabled. Alternatively, there may be situations where certain portions of the secure software are allowed to operate even if the software is not verified. The method then ends at 535.

In the various embodiments described above, the secure software or portions of the secure software may be enabled upon authentication or verification of the SIM card 128. This enablement may also take to form or receiving information from the SIM card 128 needed for the operation of the secure software application 136. For example, specific parameters or even a section of code. Such information may be encrypted by the SIM card before being sent to the secure software application 136. Such a provision may provide an additional layer of protection in binding the secure software application 136 to a specific SIM card 128.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method comprising:
   receiving, at a processor of a mobile device, a cryptographic key shared with a SIM card of the mobile device;
   encrypting the received cryptographic key using a cryptographic function;
   transmitting, by the processor, an authentication challenge to the SIM card;
   receiving by the processor an authentication response from the SIM card;
   verifying the authentication response from the SIM card; and
   enabling a secure software application stored in a memory at the mobile device when the authentication response from the SIM card is verified, wherein enabling the secure software application includes receiving information from the SIM card that enables the operation of the secure software application.

2. The method of claim 1, wherein enabling the secure software application includes enabling secure portion of the secure software application.

3. The method of claim 1, wherein the secure software application is configured to perform cryptographic functions.

4. The method of claim 1, wherein the shared cryptographic key is the SIM key Ki.

5. The method of claim 3, wherein the cryptographic functions include one of a symmetric encryption/decryption function, an asymmetric encryption/decryption function, a hash function, and a digital signature function.

6. A method comprising:
   receiving at a processor of a mobile device a cryptographic key shared with a SIM card of the mobile device;
   encrypting in the received cryptographic key using a cryptographic function;
   authenticating, by the processor, a connection between the mobile device and a mobile network control server;
   transmitting an authentication challenge to the SIM card;
   receiving an authentication response from the SIM card;
   sending the authentication response from the SIM card to the mobile network control server;
   receiving from the mobile network control server a verification of the authentication response from the SIM card; and
   enabling a secure software application stored in a memory at the mobile device when the authentication response from the SIM card is verified by the mobile network control server, wherein enabling the secure software application includes receiving information from the SIM card that enables the operation of the secure software application.

7. The method of claim 6, wherein enabling the secure software application includes enabling secure portion of the secure software application.

8. The method of claim 6, wherein the secure software application is configured to perform cryptographic functions.

9. The method of claim 8, wherein the cryptographic functions include one of a symmetric encryption/decryption function, an asymmetric encryption/decryption function, a hash function, and a digital signature function.

10. A method for binding a secure software application to a mobile device wherein the mobile device includes a processor and a subscriber identity module (SIM) card, comprising:

receiving, by a processor of a mobile device, a cryptographic key shared with a SIM card of the mobile device;

encrypting the received cryptographic key using a cryptographic function;

authenticating, by the processor, a connection between the mobile device and a mobile network control server;

requesting from the mobile network control server a verification of the SIM card;

receiving from the mobile network control server a verification of the SIM card; and enabling a secure software application stored in a memory at the mobile device when the SIM card is verified by the mobile network control server, wherein enabling the secure software application includes receiving information from the SIM card that enables the operation of the secure software application.

11. The method of claim 10, wherein enabling the secure software application includes enabling secure portion of the secure software application.

12. The method of claim 10, wherein the secure software application is configured to perform cryptographic functions.

13. The method of claim 1, wherein the shared cryptographic key is the SIM key Ki.

14. The method of claim 12, wherein the cryptographic functions include one of a symmetric encryption/decryption function, an asymmetric encryption/decryption function, a hash function, and a digital signature function.

* * * * *